April 20, 1937.                R. S. SANFORD                2,078,210
                         BRAKE TORQUE REACTION DEVICE
                            Filed July 8, 1932
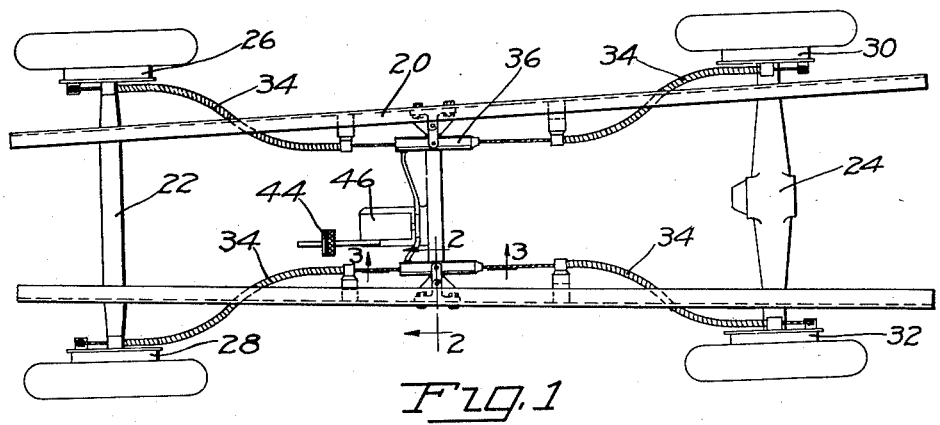
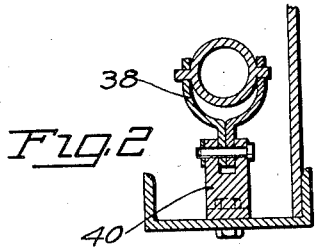
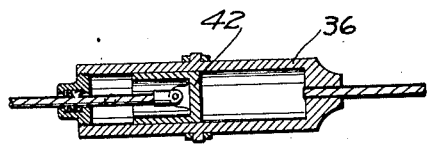
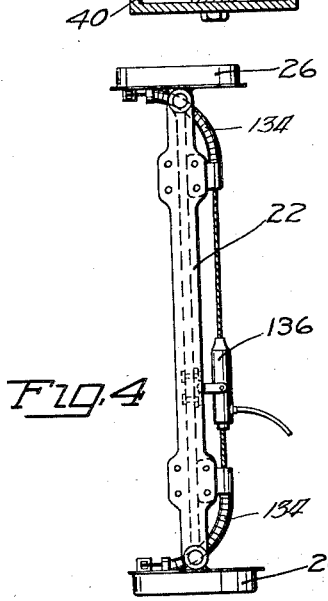
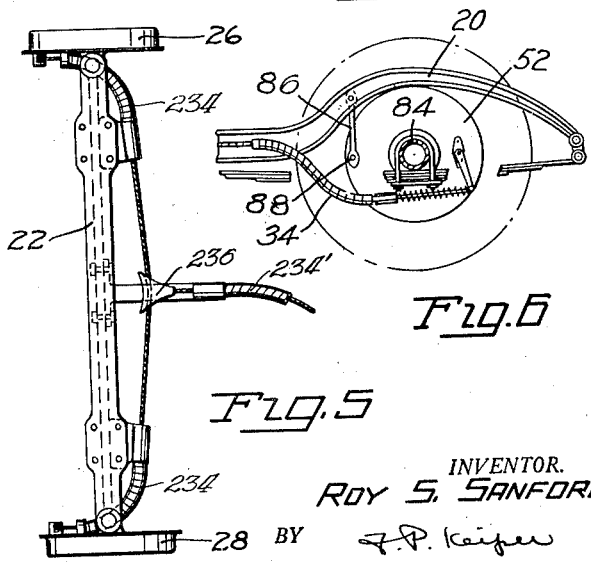
INVENTOR.
ROY S. SANFORD
BY
ATTORNEY.

Patented Apr. 20, 1937

2,078,210

UNITED STATES PATENT OFFICE 2,078,210

BRAKE TORQUE REACTION DEVICE

Roy S. Sanford, South Bend, Ind., assignor to Bendix Aviation Corporation, South Bend, Ind., a corporation of Delaware Application July 8, 1932, Serial No. 621,445

3 Claims. (Cl. 188—190)

This invention relates to brakes and is illustrated as embodied in a novel system of brakes adapted for use on automotive vehicles, some features of which are of special advantage in a system of brakes and others which include a novel manner of transferring the braking torque to the frame of a vehicle together with a novel brake construction which as illustrated is readily adaptable to the system.

There is illustrated in the drawing a novel construction wherein the spring suspension of the vehicle is adapted to absorb the shock of brake application directly and relieve the springs from carrying a twisting load of the brake, and a novel brake hookup wherein hydraulic or fluid pressure equalization is present.

Accordingly, an object of this invention is the provision of a mechanical brake system utilizing fluid pressure equalizing means for improved operation.

Another object of the invention is to provide a novel arrangement for relieving the spring suspension of a vehicle from the twisting action resulting from brake torque, providing smoother brake operation.

The above and other novel features of the invention will appear more fully hereinafter from the following detailed description when taken in connection with the accompanying drawing. It is expressly understood, however, that the drawing is employed for purposes of illustration only and is not designed as a definition of the limits of the invention, reference being had for this purpose to the appended claims.

In the drawing wherein similar reference characters refer to similar parts throughout the several views:

Figure 1 is a top plan view of an automotive vehicle chassis illustrating a brake system of this invention;

Figure 2 is a section on the line 2—2 of Figure 1, showing a floating support for an equalizing cylinder;

Figure 3 is a longitudinal section on the line 3—3 of Figure 1 illustrating a cylinder and piston and associated connections;

Figure 4 is an alternative construction wherein a right and left-hand brake are tied together in pairs rather than front and rear, as in Figure 1;

Figure 5 is a modification along the lines of Figure 4; and

Figure 6 is an elevation partly in section showing a vehicle having resilient wheel suspension, and brake and torque taking means therefor.

Referring more in detail to Figure 1 there is shown therein a chassis 20 having a front axle 22 and a rear axle 24 provided with front wheel brakes 26 and 28 and rear wheel brakes 30 and 32. A cable and conduit 34 forming a Bowden control is connected to each of these brakes and a front and rear cable of two corresponding ones of the Bowden controls are associated with a cylinder 36 having a piston therein. The cylinder 36, as shown in Fig. 2, is pivotally mounted upon a pivoted fork 38 mounted upon a frame bracket 40 and contains therein a piston 42. The floating cylinder is connected to one brake cable while the piston 42 is connected to the other end and, as shown, the piston and cylinder are adapted to be actuated hydraulically by means of the pedal 44 and apparatus 46. It will, of course, be realized that the cylinder and piston 36 and 42 may be actuated by air pressure or vacuum and the size thereof varied in accordance with the fluid pressures to be used.

In Figure 4 there is shown a structure similar to Figure 1 except that the cylinder 136 therein shown ties up a right and left-hand front or rear Bowden control 134.

In Figure 5 a similar structure to Figure 4 is shown with the exception that a mechanical equalizer 236, in the form of a yoke slidably engaging and tensioning a single cross cable forming part of right and left Bowden controls 234, is used between a front or rear pair of brakes and a single cable, forming part of a Bowden control 234', extends to any suitable equalizing mechanism located between the front pair of brakes and rear pair.

In order to relieve the spring suspension of the vehicle from the twisting movement resulting from brake torque, the backing plate 52, as shown in Figure 6, may be pivotally mounted upon an axle 84 and in order to transmit braking torque, a link 86 is provided connecting frame 20 with a point 88 eccentrically disposed upon the backing plate. When this construction is utilized considerable extra slack must be provided in the cable 34 and its conduit for the reason that the backing plate 52 may rotate through a considerable angle upon a severe application of the brakes.

In operation, it will of course, be seen in Figure 1, that the cylinder 36, being adapted to float, will react equally with the piston 42 in pulling the front or rear brake cables thus providing accurate equalization at all times.

Operation of the torque taking system in Figure 6 is as follows: Upon application of the brakes with the vehicle preceding in the forward direction, rotation of the backing plate 52 in a counterclockwise direction will tend to take place, thus tensioning the link 86 and drawing the vehicle frame downward towards the axle and compressing the spring suspension normally. Without this structure, this torque would react through the spring suspension tending to twist the same producing excessive stresses in one end and relieving the stresses in the other, thus tending to fracture or produce a permanent seat in the spring. Upon reverse, the action is similar but tends to lift the weight of the car and relieve the spring.

Though only one embodiment of the invention has been illustrated and described, it is to be understood that the invention is not limited thereto, but may be embodied in various mechanical forms and combinations as may be desired. As various changes in construction and arrangement of parts may be made without departing from the spirit of the invention, as will be apparent to those skilled in the art, reference will be had to the appended claims for a definition of the limits of the invention.

What is claimed is:

1. An automotive vehicle comprising an axle, a resilient suspension therefor, a brake mounted on the axle including an anchor-carrying backing plate rotatably mounted on the axle, and a substantially vertical link pivoted at its ends and connecting an eccentric point on said backing plate to the frame of said vehicle.

2. In an automotive vehicle, a frame, a resiliently suspended axle, a rotatable brake support mounted on said axle, a rotary brake drum, friction means anchoring on said support and adapted to engage said drum, and a vertical link pivoted at its ends to said frame and to said support and arranged to substantially vertically transmit the braking torque of said support to said frame.

3. In an automotive vehicle, a frame, a resiliently suspended axle, a backing plate rotatably mounted on said axle, friction means anchoring on the backing plate, applying means for said friction means, a flexible enclosure for said applying means attached to the backing plate and to the frame, and a substantially vertical link eccentrically pivoted on said backing plate at one end and pivoted on the frame at its other end.

ROY S. SANFORD.